Oct. 16, 1962  R. N. McCOOL  3,059,107
RAILROAD ROLLING STOCK BEARING TEMPERATURE MONITOR
Filed May 8, 1959  2 Sheets-Sheet 1
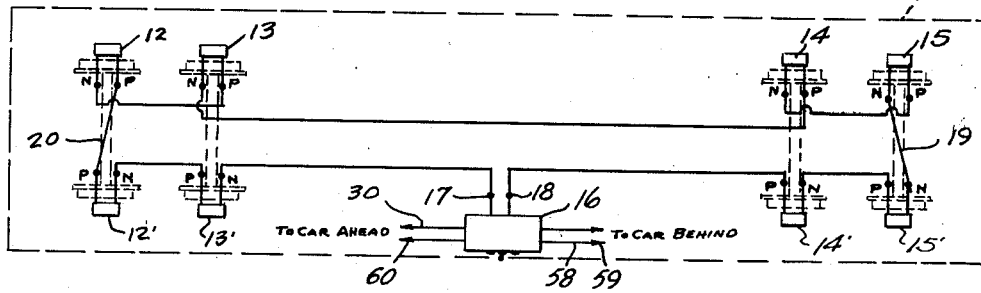
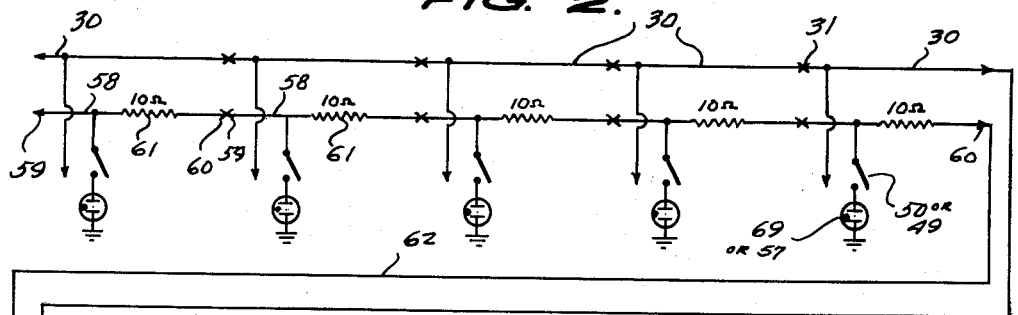
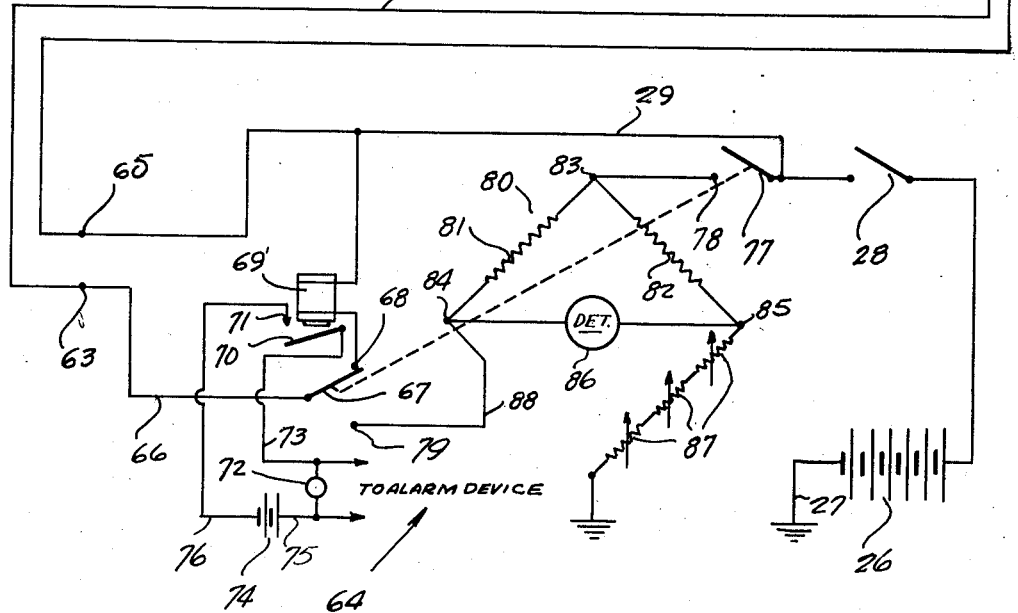
INVENTOR.
RAYMOND N. McCOOL
BY
McMorrow, Berman + Davidson
ATTORNEYS

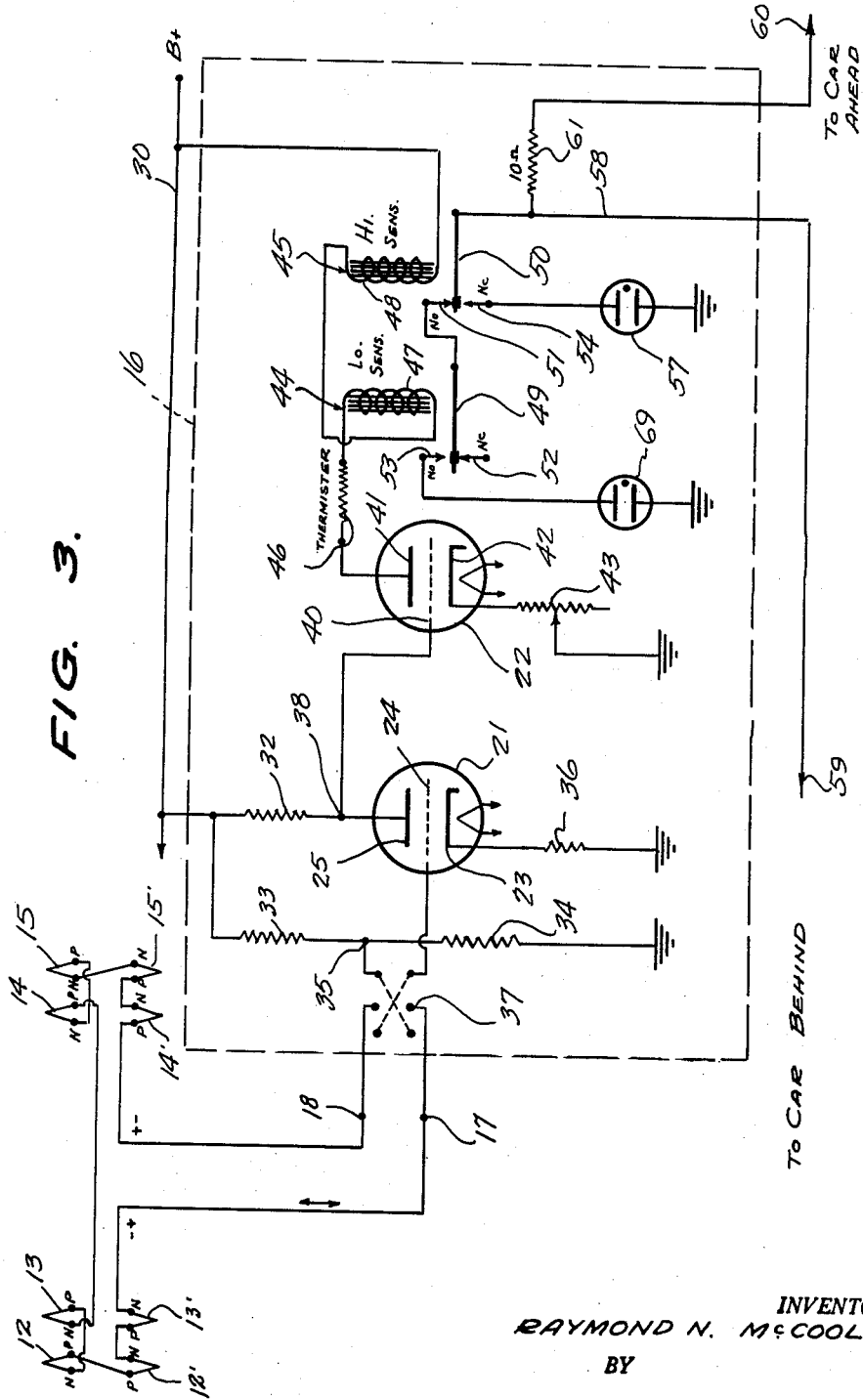

United States Patent Office 3,059,107
Patented Oct. 16, 1962

3,059,107
RAILROAD ROLLING STOCK BEARING TEMPERATURE MONITOR
Raymond N. McCool, 2459 Logan St., Pomona, Calif.
Filed May 8, 1959, Ser. No. 812,058
6 Claims. (Cl. 246—169)

This invention relates to hot bearing indication apparatus, and more particularly to an alarm and detection system for railway cars for indicating to the engineer of a train or other operating personnel when an axle bearing of a railway car or locomotive of the train is overheated.

A main object of the invention is to provide a novel and improved alarm and detection system for detecting the presence of an overheated axle bearing and for allowing the defective bearing to be accurately and quickly located, the apparatus involving simple components, being easy to operate, and providing a reliable indication of the presence of an overheated bearing, whereby the engineer or other individual in charge of the train will be notified of the existence of said bearing and of its location so that proper action may be taken to correct the defect without excessive risk of further damage to the associated railway car or of damage to the entire train.

A further object of the invention is to provide an improved alarm and detection system to detect the presence of and locate a hot bearing on a railway car, the system involving relatively inexpensive components, being reliable in operation, and being arranged so that it is not seriously affected by changes in ambient temperature.

A still further object of the invention is to provide an improved alarm and detection system to detect and locate hot bearings on a railway car, the system being relatively compact in size, being easy to install, and being provided with means to indicate which side of a car has a faulty or overheated bearing, the apparatus being adjustable in accordance with the direction of forward travel of the car.

A still further object of the invention is to provide an improved alarm and detection system to detect and locate a hot bearing on a railway car of a train, the system being provided with alarm means which becomes energized when any bearing of the railway cars of a train becomes overheated, notifying the engineer of the presence of the hot bearing, the system being provided with means whereby the engineer may then quickly test the system to locate the car containing the defective bearing.

Further objects and advantages of the invention will become apparent from the following description and claims, and from the accompanying drawings, wherein:

FIGURE 1 is a schematic diagram showing the manner in which pairs of thermocouples associated with the respective wheel bearings of the respective trucks of a railway car are electrically connected.

FIGURE 2 is a schematic electrical diagram showing the manner in which the respective fixed value resistors associated with each car of a railway train are connected in circuit with a Wheatstone bridge device, whereby a car with a defective bearing may be located by adjusting the Wheatstone bridge device to a null condition.

FIGURE 3 is a schematic wiring diagram of a detecting and amplifying circuit associated with a railway car and forming part of a system according to the present invention.

Referring to the drawings, 11 diagrammatically illustrates a railway car forming part of a train provided with an improved hot bearing detection and locating system according to the present invention. Each of the trucks of the railway car 11 is provided adjacent the ends of its respective axles with a pair of thermocouples, shown respectively at 12, 13, 12', 13', 14, 15 and 14', 15'. Thus, as shown in FIGURE 1, the truck at the left end of the railway car is provided at one side thereof with the thermocouples 12 and 13 and at the other side thereof with the thermocouples 12' and 13'. At the opposite end of the railway car, the truck is provided at one side thereof with the thermocouples 14, 15 and at the other side with the thermocouples 14', 15', the respective thermocouples being in heat-receiving relationship with the bearings associated with the respective end portions of the wheel axles of the trucks. Mounted on each car of the train is a detection and amplifying unit 16 having a pair of input terminals 17 and 18. The thermocouples 12, 13, 14 and 15 at one side of the car are connected in series in a manner to provide adition of the respective voltages generated by the said thermocouples 12, 13, 14 and 15. Thus, at the right end of the car 11 a wire 19 is connected to the "negative" terminal of the thermocouple 15. At the left end of the car, a wire 20 is connected to the "positive" terminal of the thermocouple 12. The thermocouples are connected between the wires 19 and 20 in series-aiding relationship, whereby a temperature rise experienced by any one of the thermocouples 12, 13, 14 and 15 will produce an increase of potential of wire 20 with respect to wire 19.

The thermocouples 12' and 13' are connected in series-aiding relationship with respect to each other, but in opposing relationship with respect to the thermocouples 12, 13, 14 and 15, namely, are connected between the wire 20 and the terminal 17 in a manner such that if either of the thermocouples 12', and 13' experiences a temperature rise, the voltage generated will be such as to decrease the potential of terminal 17 with respect to terminal 20. The thermocouples 14' and 15' are similarly connected, namely, are connected between the terminal 18 and the wire 19 in opposing relationship to the thermocouples 12, 13, 14 and 15, whereby a voltage generated by either thermocouple 14' or thermocoupe 15' opposes the voltages which may be generated by the thermocouples 12, 13, 14 and 15, and thus elevates the potential of terminal 18 with respect to wire 19. Since thermocouples 12', 13', 14' and 15' are similar to but connected in opposition with thermocouples 12, 13, 14 and 15, when all of the thermocouples experience the same temperature rise, as may be produced by an increase in ambient temperature, the voltages generated by the thermocouples cancel each other and therefore there is no change in potentail across terminals 17 and 18. However, should an excessive temperature rise be experienced by any one of the thermocouples, this will develop a signal voltage across the terminals 17 and 18, and the polarity of the voltage will depend upon which side of the railway vehicle contains the source of temperature increase, namely, a hot bearing. If any one of the themocouples 12, 13, 14 or 15 experiences the increase in temperature, terminal 17 becomes positive with respect to terminal 18. However, if one of the thermocouples 12', 13', 14' or 15' experiences a temperature rise, terminal 17 becomes negative with respect to terminal 18. Under normal conditions there is no difference of potential between terminals 17 and 18, and a signal potential develops only when one of the thermocouples experiences an increase in temperature, for example, when a hot bearing develops.

As above stated, a detection and amplifying unit 16 is mounted on the rearward car 11, said unit 16 comprising an input vacuum tube 21 and an amplifier output tube 22. The input tube 21 comprises a cathode 23, a control grid 24 and a plate 25. A plate battery 26 is provided in the cab of the locomotive associated with the train, the battery 26 having its negative terminal grounded, as shown at 27, FIGURE 2. The positive terminal of the battery 26 is connected through a manually controlled master switch 28 to a positive plate voltage conductor 29 which is connected in series with plate voltage conductor sections 30 extending through the various railway cars of the train, the sections being interconnected by suitable conventional connectors 31 in the manner schematically illustrated in FIGURE 2. In each amplifier 16, the plate 25 of its associated input vacuum tube 21 is connected to the associated wire 30 through a plate resistor 32, as shown in FIGURE 3.

Connected between the positive voltage wire 30 and ground are the series-connected bias voltage bleeder resistors 33 and 34, the resistors being selected so that the voltage at their junction 35 is of such a value that when applied to the grid 24 of tube 21, the voltage will place the tube substantially at the intermediate portion of the linear part of its plate current-grid voltage characteristic.

A further component of the grid bias is provided by a bias resistor 36 which is connected between cathode 23 and ground. The net grid voltage normally available at the junction point 35 therefore will include as a component the voltage drop across the cathode resistor 36.

As shown in FIGURE 3, terminals 17 and 18 are connected through a manually operated reversing switch 37 between the junction point 35 and the grid 24.

As will be readily apparent, under normal conditions, namely, in the absence of an overheated bearing, a specified voltage drop exists across the plate resistor 32, placing the plate terminal of resistor 32, shown at 38, at a definite potential with respect to ground.

As above explained, when any one of the thermocouples 12 to 15 or 12′ to 15′ experiences a substantial temperature rise, for example, when a hot box develops, a signal voltage will develop across the terminals 17 and 18, and the polarity of said signal voltage will depend upon which side of the car contains the hot bearing. If one of the thermocouples 12′ to 15′ experiences a temperature rise, the signal voltage is of such a polarity as to make terminal 17 negative with respect to terminal 18. Conversely, if one of the thermocouples 12 to 15 experiences a temperature rise, the signal voltage is reversed in polarity and makes the terminal 17 positive with respect to the terminal 18. As will be seen in FIGURE 3, the grid 24 is connected through the detecting circuit and the reversing switch 37 to the junction point 35 of the bias voltage bleeder network 33, 34. A signal voltage is thus algebraically added to the voltage of the junction point 35 when it is applied to the grid 24. However, by reversing the switch 37, the signal voltage may be algebraically subtracted from the voltage at the junction point 35 when it is applied to the grid 24.

For a given direction of movement of the railway car, for example, for movement to the left, as viewed in FIGURE 1, the switch 37 will be in the position establishing the connections shown in dotted view in FIGURE 3, whereby the signal voltage applied to the grid 24 is the algebraic sum of the voltage across the terminals 17 and 18 and the voltage at the junction 35. Therefore, if a hot journal occurs on the side of the car containing the thermocouples 12 to 15, the signal voltage applied to grid 24 is equal to the positive voltage at the junction 35 less the voltage developed across the terminals 17 and 18, said terminal 18 being negative with respect to terminal 17 under these conditions. Conversely, if the hot journal is on the side of the car containing the thermocouples 12′ to 15′, the positive voltage applied to the grid 24 is equal to the positive voltage at the junction point 35 plus the voltage between terminals 17 and 18, since under these conditions, terminal 17 is negative with respect to terminal 18.

As above mentioned, the grid 24 is normally biased so that the tube is placed substantially at the intermediate portion of the linear part of its plate current-grid voltage characteristics. When the grid 24 is made more positive, an increase in plate current occurs which substantially increases the control voltage existing across the plate resistor 32. Conversely, when the grid 24 is reduced in potential, the control voltage across the resistor 32 considerably decreases.

Designated at 22 is an amplifier output tube which includes a control grid 40, a plate 41 and a cathode 42. The cathode 42 is connected to ground through a variable resistor 43, whereby the normal bias on the grid 40 may be adjusted, thus establishing a desired sensitivity of the tube 22. Control grid 40 is connected to the plate terminal 38 of tube 21, whereby the control voltage (the plate voltage of tube 21) is applied to the grid 40.

A pair of relays 44 and 45 have their windings connected in series between the plate voltage wire 30 and the plate 41 of tube 22, a thermistor 46 being included in the series circuit to compensate for changes in ambient temperature and to prevent such changes from affecting the desired operation of the relays 44 and 45. Relay 44 is provided with the winding 47 and relay 45 is provided with the winding 48. Relay 44 is substantially of low sensitivity as compared with relay 45, and the normal plate current of tube 22 is sufficient to maintain relay 45 energized but is insufficient to maintain relay 44 energized. Thus, the normal value of plate current flowing through the windings 47 and 48 is insufficient to elevate the armature 49 of relay 44 but is sufficient to maintain the armature 50 of relay 45 elevated and in engagement with the upper contact 51 of said relay 45. Since the armature 49 is normally released, the armature merely rests against the bottom contact 52 of relay 44. When the plate current increases sufficiently to energize the winding 47 of relay 44, the armature 49 is raised into engagement with the upper contact 53 of said relay 44. When the plate current drops below a predetermined value, the winding 48 of relay 45 is insufficiently energized to maintain armature 50 elevated and the armature 50 thus drops into engagement with the bottom contact 54 of relay 45.

In a typical design, tubes 21 and 22 may comprise the respective triode sections of a 6SL7 tube; the voltage on the conductor 30 may be 200 volts positive; resistor 32 may be 80,000 ohms; resistor 36 may be approximately 1500 ohms; resistor 33 may be approximately 19,300 ohms; and resistor 34 may be approximately 700 ohms. This provides a voltage at point 35 of 0.7 volt positive. With the values above given, there is provided at the point 38 a normal quiescent voltage giving ample dynamic range of operation of triode section 22 and also ample voltage gain for operation of the relays 44 and 45.

As above mentioned the normal plate current of tube 22 is sufficient to maintain relay 45 energized but insufficient to energize the relay 44. When a hot box occurs on the side of the railway car containing the thermocouples 12′ to 15′, with switch 37 in the position shown in dotted view in FIGURE 3, the voltage on the grid 24 is increased sufficiently to considerably increase the voltage drop across the resistor 32, whereby the voltage at the plate terminal 38 is substantially decreased from its normal value, thus reducing the positive voltage on grid 40 and thereby accordingly reducing the plate voltage of tube 22. Under these conditions, relay 45 becomes deenergized and its armature 50 drops into engagement with its lower contact 54. As shown in FIGURE 3, contact 54 is connected to one terminal of a neon lamp 57. The other terminal of the neon lamp is grounded, whereby when armature 50 engages contact 54 the neon lamp 57 is connected between ground and a wire 58.

Wire 58 is provided at one end with a terminal connector 59 and is connected at its other end to a terminal connector 60 through a resistor 61 of a definite predetermined value. The connectors 59 and 60 are of conventional design and are adapted to be connected together, to establish the electrical connections shown in FIGURE 2, whereby the wires 58 and resistors 61 are connected in series along the train. The last terminal 60 is connected by a wire 62 to one terminal 63 of a master control unit 64 mounted in the cab of the locomotive of the train. As shown in FIGURE 2, the wire 29 is connected to another terminal 65 of the control unit 64, the serially connected wires 30 being connected to terminal 65.

Terminal 63 is connected by a wire 66 to the pole 67 of a manually operated double throw switch, the pole 67 normally engaging one of its stationary contacts shown at 68. The contact 68 is connected through the winding of a relay 69' to the wire 29. In the position of the pole 67 shown in FIGURE 2, when armature 50 engages contact 54 wire 58 is connected to the positive battery wire 29 through the serially connected resistors 61, the wire 62, the wire 66, pole 67, contact 68, and the winding of relay 69'. The battery voltage is sufficient, with master switch 28 closed, under these circumstances, to fire the neon lamp 57, thus providing an indication on the railway car of the presence of a hot box on the side of the railway car containing the thermocouples 12' to 15'.

Similarly, if the hot box occurs on the side of the railway car containing the thermocouples 12 to 15, the voltage on grid 24 is reduced by the value equal to the signal voltage developed across terminals 17 and 18 and the plate voltage of tube 21 is accordingly decreased. This decreases the voltage drop across the load resistor 32, whereby the control voltage on grid 40 is increased, increasing the plate current of tube 22 to a value sufficient to energize the relay 44. When the relay 44 thus becomes energized, it elevates its armature 49 into engagement with its upper contact 53, which is connected to one terminal of another neon lamp 69, the remaining terminal of said lamp 69 being grounded, as shown in FIGURE 3. The lamp 69 is thus connected between ground and the wire 58 through the armature 49, the upper contact 51 of relay 45 and the armature 50 of said relay 45. Thus, under these conditions neon lamp 69 becomes energized thus providing an indication on the railway car 11 that a hot box exists on the side of the railway car containing thermocouples 12 to 15.

As will be readily understood, the indications will be reversed if switch 37 is reversed, as will be done if the car should be arranged in a train moving to the right in FIGURE 1 instead of to the left. As above explained, switch 37 is set in accordance with the direction of movement of a railway car.

As above mentioned, when a hot box occurs in any one of the railway cars with master switch 28 closed, the winding of relay 69' is placed in series with the wire 62 and the plate wire 29, a conductive path to ground being established by the firing of one of the neon lamps 57 or 69, so that sufficient current flows in the winding of the relay 69' to energize same. The armature 70 of relay 69 is thus elevated into engagement with its upper contact 71. An indicating lamp 72 is provided in the control unit 64, the armature 70 being connected by a wire 73 to one terminal of the lamp 72. A battery 74 has one pole thereof connected by a wire 75 to the other terminal of the lamp 72, the remaining pole of battery 74 being connected by a wire 76 to the contact 71. Thus, the energization of relay 69' energizes the indicating lamp 72 through armature 70 and contact 71 of the relay, causing lamp 72 to provide an indication in the cab of the locomotive of the existence of a hot box on the train.

The pole 67 of the manually operated two-position switch is mechanically coupled in any suitable manner to the pole 77 of another switch which is normally in the open position shown in FIGURE 2, but which is rotatable into engagement with a contact 78 simultaneously with the rotation of pole 67 into engagement with its remaining contact 79.

Thus, as will be readily apparent, the poles 67 and 77 may be the respective poles of a double pole double-throw switch wherein pole 77 is utilized with a single contact 78.

Designated at 80 is a Wheatstone bridge comprising the fixed resistance arms 81 and 82 having a common junction 83 which is connected to the switch contact 78. The opposite terminals of the resistors 81 and 82 are respectively connected to junctions 84 and 85, and a conventional null indicator 86 is connected across the junctions 84 and 85. The indicator 86 may be an ordinary meter. Connected between the junction 85 and ground is a calibrated variable resistance unit which may comprise respective decade-related calibrated variable resistance members 87. The remaining junction 84 of the bridge is connected by a wire 88 to the switch contact 79, so that the pole 67 connects wire 66 to junction 84 when pole 67 is rotated to its lowered position. In this position the pole 77 is connected to the contact 78, whereby the positive terminal of battery 26 is connected to the junction 83.

When a hot box develops in the train with master switch 28 closed, the engineer receives notification of this condition by the energization of the lamp 72. The defective railway car is then located by operating the switch poles 67 and 77 to rotate them to their lowered positions, whereby the circuit comprising wire 66, wire 62, the serially connected resistors 61 leading to the defective railway car, the resistor 61 in said car, and the current path through the energized neon lamp 57 or 69 is connected into the bridge 80 as the remaining arm thereof.

Since each of the resistors 61 is of a specified definite resistance value, for example 10 ohms, and since the resistance arms 81 and 82 of the bridge are fixed in value and preferably of equal value, the decade-related adjustable resistance members 87 may be adjusted to provide a null indication on the meter or other null-indicating device 86. When such a null indication has been obtained, the dials on the calibrated adjustable resistance members 87 will provide a reading in accordance with the number of cars between the locomotive and the car containing the defective journal bearings, so that said car may be instantly located. The presence of the defective journal bearing in said car will be verified by the energization of one of the neon lamps 57 or 69, and these neon lamps will also provide an indication as to which side of the car contains the defective bearing, since as above explained, one or the other of the lamps will be energized in accordance with which side of the car contains the defective bearing.

Therefore, as will be readily apparent, when a defective bearing develops, an indication is provided in the cab of the locomotive by the energization of the lamp 72, whereby the engineer is apprised of the defective bearing and may take the necessary measures to correct same. The defective railway car may be located in the manner above described by balancing the bridge 80, and the information thus obtained will be verified by examining the suspected railway car to determine whether either of the lamps 57 or 69 is energized.

As will be well understood to those skilled in the art, after either of the lamps 69 or 57 fires, the resistance across the lamp is relatively low, so that it will not disturb or interfere with establishing an accurate adjustment of the bridge 80 and balancing same so as to obtain the desired reading on the dials of the decade-related calibrated resistance units 87.

While a specific embodiment of an improved apparatus for detecting and locating defective bearings on a railway car or similar vehicle has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a vehicle having a pair of bearing assemblies on opposite sides thereof, respective thermocouples mounted in heat-receiving relation to said bearing assemblies, circuit means connecting the thermocouples on each side of the vehicle in series-aiding relation and the series of thermocouples on the respective sides of the vehicle in series opposition, whereby to define a temperature rise-detecting circuit deriving a signal voltage whose polarity depends upon which side of the vehicle contains a thermocouple experiencing a temperature rise, respective neon lamps energized in accordance with the polarity of the signal voltage, a Wheatstone bridge, a resistor on the vehicle, means to connect said resistor through one of said neon lamps to said bridge as an arm of the bridge responsive to the presence of said signal voltage, means to energize said one neon lamp while it is connected to said bridge, and manually adjustable means to balance the bridge.

2. In a vehicle having a pair of bearing assemblies in opposite sides thereof, respective thermocouples mounted in heat-receiving relation to said bearing assemblies, circuit means connecting the thermocouples on each side of the vehicle in series-aiding relation and the series of thermocouples on the respective sides of the vehicle in series opposition, whereby to define a temperature rise-detecting circuit deriving a signal voltage whose polarity depends on which side of the vehicle contains a thermocouple experiencing a temperature rise, respective indicating devices energized in accordance with the polarity of the signal voltage, a Wheatstone bridge having a pair of arms of fixed resistance value, a calibrated variable resistance third arm, a resistor on the vehicle, and means to connect said resistor through one of said indicating devices as the fourth arm of said bridge responsive to the presence of said signal voltage.

3. In a vehicle having a pair of bearing assemblies on opposite side thereof, respective thermocouples mounted in heat-receiving relation to said bearing assemblies, circuit means connecting the thermocouples on each side of the vehicle in series-aiding relation and the series of thermocouples on the respective sides of the vehicle in series opposition, whereby to define a temperature rise-detecting circuit deriving a signal voltage when one of the thermocouples experiences a temperature rise to a value substantially greater than the temperature of the other thermocouple, the polarity of said signal voltage being in accordance with which side of the vehicle contains a thermocouple experiencing said temperature rise, an amplifier comprising an input vacuum tube having a grid, a plate and a cathode, a source of plate voltage connected across said plate and cathode, a source of bias voltage of a value sufficient when applied to said grid to place the tube substantially at the intermediate portion of the linear part of its plate current-grid voltage characteristic, means connecting said source of bias voltage to said grid through said temperature rise-detecting circuit, whereby the voltage on the grid will increase or decrease in accordance with which of the thermocouples experiences said temperature rise, and whereby the plate current will similarly change, a pair of indicating devices, and means to selectively energize said indicating devices responsive to respectively an increase or decrease of said plate current.

4. In a vehicle having a pair of bearing assemblies on opposite sides thereof, respective thermocouples mounted in heat-receiving relation to said bearing assemblies, circuit means connecting the thermocouples on each side of the vehicle in series-aiding relation and the series of thermocouples on the respective sides of the vehicle in series opposition, whereby to define a temperature rise-detecting circuit deriving a signal voltage when one of the thermocouples experiences a temperature rise to a value substantially greater than the temperature of the other thermocouple, the polarity of said signal voltage being in accordance with which side of the vehicle contains a thermocouple experiencing said temperature rise, an amplifier comprising an input vacuum tube having a grid, a plate and a cathode, a source of plate voltage connected across said plate and cathode, a source of bias voltage of a value sufficient when applied to said grid to place said tube substantially at the intermediate portion of the linear part of its plate current-grid voltage characteristic, means connecting said source of bias voltage to said grid through said temperature rise-detecting circuit, whereby the voltage on the grid will increase or decrease in accordance with which of the thermocouples experiences said temperature rise, and whereby the plate current will similarly change, means to derive a control voltage in accordance with said plate current, an amplifier, means applying said control voltage to the input of said amplifier, a pair of current-responsive relays of different sensitivity connected to the output of said amplifier, the normal output current of said amplifier being sufficient to energize one of said relays but insufficient to energize the other relay, a pair of indicating devices, means to energize one of said indicating devices responsive to a rise in output current of said amplifier to a value sufficient to energize said one of the relays, and means to energize the other indicating device responsive to a decrease of output current of said amplifier to a value sufficient to deenergize the other relay.

5. In a vehicle having a pair of bearing assemblies on opposite sides thereof, respective thermocouples mounted in heat-receiving relation to said bearing assemblies, circuit means connecting the thermocouples on each side of the vehicle in series-aiding relation and the series of thermocouples on the respective sides of the vehicle in series opposition, whereby to define a temperature rise-detecting circuit deriving a signal voltage when one of the thermocouples experiences a temperature rise to a value substantially greater than the temperature of the other thermocouple, the polarity of said signal voltage being in accordance with which side of the vehicle contains a thermocouple experiencing said temperature rise, an amplifier including an input vacuum tube having a grid, a plate and a cathode, a source of plate voltage connected across said plate and cathode, a source of bias voltage of a value sufficient when applied to said grid to place said tube substantially at the intermediate portion of the linear part of its plate current-grid voltage characteristic, means connecting said source of bias voltage to said grid through said temperature rise-detecting circuit, whereby the voltage on the grid will increase or decrease in accordance with which of the thermocouples experiences said temperature rise, and whereby the plate current will similarly change, a pair of indicating devices, means to selectively energize said indicating devices in accordance respectively with an increase or decrease of said plate current, a Wheatstone bridge having a pair of arms of fixed resistance value, a calibrated variable resistance third arm, a resistor on the vehicle, and means responsive to the energization of either of said indicating devices to connect said resistor through one of said indicating devices as the fourth arm of said bridge.

6. In a vehicle having a pair of bearing assemblies on opposite sides thereof, respective thermocouples mounted in heat-receiving relation to said bearing assemblies, circuit means connecting the thermocouples on each side of the vehicle in series-aiding relation and the series of thermocouples on the respective sides of the vehicle in series opposition, whereby to define a temperature rise-detecting circuit deriving a signal voltage when one of the thermocouples experiences a temperature rise to a value substantially greater than the temperature of the other thermocouples, the polarity of said signal voltage being in accordance with which side of the vehicle contains a thermocouple experiencing said temperature rise, an amplifier including an input vacuum tube having a grid, a plate and a cathode, a source of plate current connected across said plate and cathode, a source of bias voltage of a value sufficient when applied to said grid to place said tube substantially at the intermediate portion of the linear part of its plate current-grid voltage characteristic, means connecting said source of bias voltage to said grid through said temperature rise-detecting circuit, whereby the voltage on the grid will increase or decrease in accordance with which of the thermocouples experiences said temperature rise, and whereby the plate current will similarly change, means to derive a control voltage in accordance with said plate current, an amplifier, means applying said control voltage to the input of said amplifier, a pair of current-responsive relays of different sensitivity connected to the output of said amplifier, the normal output current of said amplifier being sufficient to energize one of said relays but insufficient to energize the other relay, a pair of indicating devices, means to energize one of said indicating devices responsive to a rise in output current of said amplifier to a value sufficient to energize said one of the relays, means to energize the other indicating device responsive to a decrease of output current of said amplifier to a value sufficient to deenergize the other relay, a Wheatstone bridge having a pair of arms of fixed resistance value, a calibrated variable-resistance third arm, a resistor on the vehicle, and means to connect said resistor through one of said indicating devices as the fourth arm of the bridge responsive to deenergization of said first relay or the deenergization of said other relay.

References Cited in the file of this patent

UNITED STATES PATENTS

| | | |
|---|---|---|
| 2,385,487 | Baughman | Sept. 25, 1945 |
| 2,408,660 | Lannge | Oct. 1, 1946 |
| 2,420,968 | Newell | May 20, 1947 |
| 2,560,753 | Weinberg | July 17, 1951 |
| 2,628,344 | Johnson et al. | Feb. 10, 1953 |
| 2,963,575 | Pelino et al. | Dec. 6, 1960 |

FOREIGN PATENTS

| | | |
|---|---|---|
| 401,667 | Germany | Sept. 8, 1924 |

OTHER REFERENCES

German application (K1 20h 1), 1,031,338, June 4, 1958.